US011174902B2

(12) United States Patent
Dannwolf et al.

(10) Patent No.: US 11,174,902 B2
(45) Date of Patent: Nov. 16, 2021

(54) FRICTIONAL PART FOR A FRICTIONALLY ACTING DEVICE

(71) Applicant: BorgWarner Inc., Auburn Hills, MI (US)

(72) Inventors: Florian Oliver Dannwolf, Mannheim (DE); Volker Reiners, St. Leon-Rot (DE); Tim Traeger, Dossenheim (DE)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 16/408,699

(22) Filed: May 10, 2019

(65) Prior Publication Data

US 2019/0345988 A1 Nov. 14, 2019

(30) Foreign Application Priority Data

May 11, 2018 (DE) .......................... 102018003830.1

(51) Int. Cl.
*F16D 13/72* (2006.01)
*F16D 69/00* (2006.01)
(Continued)

(52) U.S. Cl.
CPC .............. *F16D 13/72* (2013.01); *F16D 13/64* (2013.01); *F16D 13/74* (2013.01); *F16D 65/127* (2013.01);
(Continued)

(58) Field of Classification Search
CPC .......... F16D 13/72; F16D 13/74; F16D 13/64; F16D 65/127; F16D 65/128; F16D 69/00;
(Continued)

(56) References Cited

U.S. PATENT DOCUMENTS

| 3,314,509 A * | 4/1967 | Pelikan ................. F16D 65/124 |
| | | 188/218 XL |
| 6,293,382 B1 * | 9/2001 | Nishide ................. F16D 13/648 |
| | | 192/107 R |

(Continued)

FOREIGN PATENT DOCUMENTS

| DE | 102010021900 A1 * | 12/2011 | ............. F16D 13/72 |
| DE | 102012014811 A1 * | 1/2014 | .......... F16D 13/648 |
| EP | 2185833 B1 | 1/2012 | |

OTHER PUBLICATIONS

English language abstract for EP 2 185 833 extracted from espacenet.com database on May 10, 2019, 2 pages.

*Primary Examiner* — Melody M Burch
(74) *Attorney, Agent, or Firm* — Howard & Howard Attorneys PLLC (57) ABSTRACT

The present invention relates to a frictional part (2) for a frictionally acting device comprising an annular friction surface (26), which has an inner edge (34) and an outer edge (36), wherein a circumferential groove (42) which extends in a zig-zag or undulating fashion between radially interior and radially exterior deflection points (44, 46), a plurality of outer grooves (64, 70) which each have an outer opening (66, 72) at the outer edge (36) and open into the circumferential groove (42) at opening points (68, 74) between the deflection points (44, 46), and a plurality of inner grooves (56, 60) which each have an inner opening (58, 62) at the inner edge (34) and open into the circumferential groove (42) between the opening points (68, 74), are provided in the friction surface (26). The outer opening (66, 72) of at least one of the outer grooves (64, 70) has a groove cross section which is larger than a groove cross section of the inner opening (58, 62) of at least one of the inner grooves (56, 60).

16 Claims, 4 Drawing Sheets

(51) Int. Cl.
  *F16D 13/64*    (2006.01)
  *F16D 13/74*    (2006.01)
  *F16D 65/12*    (2006.01)
  *F16D 65/02*    (2006.01)
(52) U.S. Cl.
  CPC ........... F16D 65/128 (2013.01); F16D 69/00 (2013.01); *F16D 2065/132* (2013.01); *F16D 2065/1332* (2013.01); *F16D 2069/009* (2013.01); *F16D 2300/0212* (2013.01); *F16D 2300/06* (2013.01)
(58) Field of Classification Search
  CPC ......... F16D 2300/06; F16D 2300/0212; F16D 2065/132; F16D 2065/1332; F16D 2069/009
  See application file for complete search history.

(56) References Cited

U.S. PATENT DOCUMENTS

| | | | |
|---|---|---|---|
| 6,626,273 B1* | 9/2003 | Baumgartner | F16D 65/123 188/218 XL |
| 7,032,724 B1* | 4/2006 | Hulten | F16D 65/128 188/18 A |
| 8,474,590 B2 | 7/2013 | Fabricius et al. | |
| 2010/0006388 A1* | 1/2010 | Fabricius | F16D 13/72 192/113.36 |
| 2012/0118696 A1* | 5/2012 | Fabricius | F16D 13/72 192/107 R |
| 2013/0032271 A1* | 2/2013 | Reiners | F16D 13/64 156/60 |

* cited by examiner

FRICTIONAL PART FOR A FRICTIONALLY ACTING DEVICE

CROSS-REFERENCE TO RELATED APPLICATIONS

This application claims the benefit of German Patent Application No. 102018003830.1 filed May 11, 2018 the disclosure of which is herein incorporated by reference in its entirety

DESCRIPTION

The present invention relates to a frictional part for a frictionally acting device with an annular friction surface which has an inner edge and an outer edge, wherein a circumferential groove which extends in a zig-zag or undulating fashion between radially interior and radially exterior deflection points, a plurality of outer grooves which each have an outer opening on the edge and open into the circumferential groove at opening points between the deflection points, and a plurality of inner grooves which each have an inner opening at the inner edge and open into the circumferential groove between the opening points, are provided in the friction surface.

A frictional part for a frictionally acting device is known from EP 2 185 833 B1, which has an annular friction surface with an inner edge and an outer edge. A circumferential groove, which extends in a zig-zag or undulating fashion between radially interior and radially exterior deflection points, is provided in the friction surface. In addition, a plurality of outer grooves which each have an outer opening at the outer edge and open into the circumferential groove at opening points between the deflection points, and a plurality of inner grooves which each have an inner opening at the inner edge and open into the circumferential groove between the opening points, are provided in the friction surface. The known frictional part is advantageous to the extent that the so-called drag torque may be reduced, due to the groove pattern within the friction surface, when the frictional part is used, for example, in a wet-running clutch and said wet-running clutch is opened. Wear on the friction surface may also be reduced due to the groove pattern.

It is the object of the present invention to refine a frictional part of the generic type in such a way that the so-called drag torque may be even further reduced and that wear on the friction surface may be even more strongly countered.

This problem is solved by the features listed in Patent claim 1 or 5. Advantageous embodiments of the invention are the subject matter of the subclaims.

The frictional part according to the invention is conceived of for a frictionally acting device. Thus, the frictional part may be, for example, a friction disk for a disk clutch or disk brake. The frictional part has an annular friction surface. The annular friction surface may, for example, be formed from the base material of the frictional part itself or from a friction lining applied to a base body or friction lining carrier. The annularly designed friction surface has an inner edge, thus an edge facing radially inward, and at outer edge, thus an edge facing radially outward, wherein a circumferential groove, in which a coolant and/or a lubricant, for example oil, may be accommodated or guided, is provided in the friction surface. A circumferential groove may be understood in particular herein as a groove, continuous in the circumferential direction, preferably closed in the circumferential direction, particularly preferably designed as annular. The circumferential groove extends in a zig-zag or undulating fashion between radially interior and radially exterior deflection points in the annular friction surface. To simplify a supply or removal of the coolant and/or lubricant in the circumferential first groove, a plurality of outer grooves are additionally provided in the friction surface, which each have an outer opening at the outer edge of the friction surface and open into the circumferential groove at opening points between the deflection points. In addition, a plurality of inner grooves, which each have an inner opening at the inner edge of the friction surface and open into the circumferential groove between the opening points, is provided in the friction surface. The outer opening of at least one of the outer grooves has a groove cross section that is larger than a groove cross section of the inner opening of at least one of the inner grooves. It is hereby preferred if a plurality of or all outer openings of the outer grooves have a groove cross section which is larger than a groove cross section of the inner opening of at least one of the inner grooves, a plurality of inner grooves, or all of the inner grooves. It has been shown that, due to the described groove pattern in the friction surfaces, not only may the drag torque be significantly reduced, but also wear of the friction surface may also be further reduced using the described constellation. In addition, it has been shown that in an open disk clutch or brake, which has at least one frictional part of this type, a fast formation of a mixture made of coolant and/or lubricant and the air within the disk clutch or disk brake may be achieved, even at relatively low speeds. It has also been shown that the described frictional part has this effect in particular in the case of a coolant or lubricant supply which is carried out from the inside, thus starting from the inner edge of the friction surface outward in the radial direction. In this respect, the use of the frictional part is preferred in a disk clutch or brake, in which the coolant and/or lubricant supply is carried out from the inside.

In one preferred embodiment of the frictional part according to the invention, the at least one outer groove with the larger groove cross section is enlarged at the outer opening in the direction of the outer opening. It is thereby preferred if the at least one outer groove is enlarged constantly and/or continuously in the direction of the outer opening. It has also proven advantageous if, starting from the opening point, the at least one outer groove initially has a constant groove cross section in a first outer groove segment before the enlargement of the outer groove in the direction of the outer opening is carried out in a second outer groove segment. Regardless of the respective embodiment variant, a further reduction of the drag torque is achieved hereby.

In another preferred embodiment of the frictional part according to the invention, at least one first outer groove, which has an outer opening with the larger groove cross section, is enlarged more strongly in a first circumferential direction than in an opposite second circumferential direction, in order to influence the coolant and/or lubricant discharge and to reduce the drag torque. In this embodiment, it is additionally preferred if at least one second outer groove of the outer grooves with a larger groove cross section at the outer opening is enlarged more strongly in the second circumferential direction than in the first circumferential direction. By this means, not only is the coolant and/or lubricant discharge improved with respect to reduced wear of the friction surface and a drag torque is reduced, but also a certain independence of rotational direction may thereby be achieved. Consequently, a correspondingly designed frictional part may be used particularly flexibly.

In one particularly preferred embodiment of the frictional part according to the invention, the previously mentioned first outer grooves and second outer grooves may be provided sequentially alternating with one another in the circumferential direction. It has hereby proven advantageous if one second outer groove respectively follows in each case a first outer groove in the circumferential direction.

In one advantageous embodiment of the frictional part according to the invention, the friction surface is partially formed by first friction segments which are radially exterior with respect to the circumferential groove and are assigned to the radially interior deflection points, and second radially exterior friction sections, which are assigned to the radially exterior deflection points, wherein the outer grooves of the friction surface are formed between the first and second radially exterior friction sections.

In order to not only reduce the drag torque due to the stronger enlargement of the first and second outer grooves, but to also contribute to the reduction of wear on the friction surface, at least one first radially exterior friction section faces one of the first outer grooves in the second circumferential direction and faces one of the second outer grooves in the first circumferential direction in one particularly advantageous embodiment of the frictional part according to the invention. In other words, both the adjacent first outer groove and also the adjacent second outer groove of the at least one first radially exterior friction section are enlarged more strongly in the direction of this first radially exterior friction section. This is advantageous in so far as that the first radially exterior friction section is assigned to the radially interior deflection point, and for this reason may already be designed with a larger area than the second radially exterior friction sections, which are assigned to the radially exterior deflection points. Consequently, the stronger enlargement of the adjacent first and second outer grooves in the direction of the first radially exterior friction section indeed results in a reduction of the first radially exterior friction section; however, this is more acceptable with respect to the wear than a further reduction of the second radially exterior friction sections. Instead, a harmonization of the sizes of the first and second radially exterior friction sections may be created by this means, which ultimately leads to a reduced or at least more even wear on the friction surface.

In another preferred embodiment of the frictional part according to the invention, the previously mentioned first radially exterior friction section has rounded corners facing the outer openings, the radius of curvature of said corners being larger than any radius of curvature of the corners of the adjacent second radially exterior friction sections facing the outer openings. This also comprises embodiment variants, in which the corners of the adjacent second radially exterior friction sections facing the outer openings are not designed as rounded corners. In the sense of reduced wear, it is, nevertheless advantageous, if the corners of the adjacent second radially exterior friction sections facing the outer openings are also rounded; however they then have a smaller radius of curvature that the rounded corners of the first radially exterior friction section.

In another advantageous embodiment of the frictional part according to the invention, the inner grooves have first inner grooves, which each have a first inner opening at the inner edge and open into the circumferential groove at the exterior deflection points, and/or second inner grooves, which each have a second inner opening at the inner edge and open into the circumferential groove at the interior deflection points. It is hereby preferred if the groove cross section of the enlarged outer opening of the at least one outer groove is larger than the groove cross section of the first inner opening or of the second inner opening, wherein it has proven to be particularly advantageous if the groove cross section of the outer opening is larger than the groove cross section of both the first inner opening and also of the second inner opening, in order to reinforce the advantages listed at the outset.

While the previously described frictional part according to the invention has the listed advantages in particular within a disk clutch or brake with a coolant and/or lubricant supply from the inside, the subsequently described frictional part according to the invention is usable particularly advantageously in a disk clutch or brake with a coolant and/or lubricant supply carried out from the outside, thus arising from the outer edge of the friction surface inward in the radial direction, in order to positively influence the friction behavior, in particular the wear of the friction surface and the drag torque. Independently from this, it should be clarified, that both the previously described frictional part according to the invention and also the subsequently described frictional part according to the invention are advantageously usable both for a coolant and/or lubricant supply from the inside and also for a coolant and/or lubricant supply from the outside; however, the advantageous then manifest themselves to varying degrees.

The frictional part according to the invention for a frictionally acting device, in particular a frictionally acting device with coolant and/or lubricant supply from outside, has an annular friction surface with an inner edge facing inward in the radial direction and an outer edge facing outward in the radial direction. A circumferential groove, which extends in a zig-zag or undulating fashion between radially interior and radially exterior deflection points, is provided in the friction surface. In addition, a plurality of outer grooves are provided in this frictional part which each have an outer opening at the outer edge and open into the circumferential groove at opening points between the deflection points. Inner grooves are also provided in this frictional part, wherein first inner grooves, which each have a first inner opening and open into the circumferential groove at the exterior deflection points, and second inner grooves, which each have a second inner opening at the inner edge and open into the circumferential groove at the interior deflection points are provided in the friction surface. In order to reduce wear and to keep the drag torque as low as possible for this frictional part, the first inner opening of at least one of the first inner grooves has a groove cross section which is larger or smaller than a groove cross section of the second inner opening of at least one of the second inner grooves. It is thus advantageous if the first inner opening of a plurality of or all first grooves has/have a groove cross section which is larger or smaller than the groove cross section of the second inner opening of a plurality of or all second inner grooves.

In one preferred embodiment of the previously described frictional part, the friction surface is formed at least partially by friction surfaces, which are radially interior with respect to the circumferential groove, and between which the first and second inner grooves are formed. The radially interior friction sections, which preferably have the same outer contour, additionally have corners facing the inner openings, wherein the corners facing the inner openings with the larger groove cross section are preferably rounded. It has thereby proven further advantageous, if the corners facing the inner openings with the larger groove cross section have a radius of curvature which is larger than any radius of curvature of the corners facing the inner openings with the smaller groove cross section. It has also been shown that the advantages of the frictional part are particularly strongly expressed if the radius of curvature of the rounded corners facing the inner openings with the larger groove cross section are at least 5 times the radius of curvature of the corners facing the inner openings with the smaller groove cross section.

The embodiment features or advantageous embodiments described subsequently in greater detail apply for both types of the previously described frictional parts according to the invention.

In another advantageous embodiment of the frictional part according to the invention, the frictional part has a friction lining carrier, which may be formed, for example, from an annular disk made of sheet metal or steel, wherein the friction surface is formed by a friction lining applied to the friction lining carrier. Thus, the friction lining may be, for example, a friction lining glued onto the friction lining carrier. However, the friction lining is preferably not designed as one piece, but instead is combined from a plurality of friction lining segments spaced apart from each other, between which the circumferential groove, the inner grooves, and the outer grooves are formed. In contrast to a friction lining designed as one piece, in which the previously mentioned grooves would have been imprinted, the segmented friction lining has the advantage that the manufacturing of the friction lining consumes less material, which leads to high cost savings in the case of expensive paper friction linings. Thus, friction lining material is only used there, where the friction surface should actually be formed, whereas, in the area of the grooves, whose bottom is now formed by the friction lining carrier, the friction lining material is omitted. In this embodiment, it is preferred if the friction lining segments form the previously described friction sections, thus, for example, the exterior and/or the interior friction sections of the frictional part. It is thus preferred if the first radially exterior friction section and the second radially exterior friction section of the frictional part are each formed by a one-piece friction lining segment. This applies correspondingly for the radially interior friction sections, which are preferably each formed by a one-piece friction lining segment.

In another advantageous embodiment of the frictional part according to the invention, the circumferential groove comprises a plurality of first groove segments, which extend in the one circumferential direction from one exterior deflection point to an interior deflection point, and a plurality of second groove segments, which extend in the same circumferential direction from an interior deflection point to an exterior deflection point. The deflection points are thereby to be preferably understood, previously and subsequently, as those points in the circumferential groove at which the radial flow direction of the coolant and/or lubricant changes within the circumferential groove.

Basically, the circumferential groove may be designed as undulating so that the first and second groove segments are designed as curved or arc-shaped. However, in another advantageous embodiment of the frictional part according to the invention, it has been shown that a particularly good cooling and a sustainably improved control of the frictionally acting device may be achieved with a frictional part in which the first and second groove segments of the circumferential groove are designed as straight. The zig-zag circumferential groove thus generated thus improves both the cooling and also the controllability. In addition, by this means another reduction of the drag torque may be achieved, particularly as, for example, the dynamic pressure is increased at the exterior deflection points in the case of an inner coolant and/or lubricant supply.

To achieve an effective cooling of those areas of the annular friction surface which are arranged outside of the circumferential groove in the radial direction, both the outer grooves, which open into the first groove segments of the circumferential groove, and also the outer grooves, which open into the second groove segments of the circumferential groove are provided in another advantageous embodiment of the frictional part according to the invention.

To improve the controllability of the frictionally acting device with the frictional part according to the invention, the first and second groove segments of the circumferential groove joined in an exterior deflection point form an inner angle which is larger than 130°, wherein an inner angle between 140° and 145° is preferred in another advantageous embodiment of the frictional part according to the invention.

According to another advantageous embodiment of the frictional part according to the invention, the groove cross section of the circumferential groove at the deflection points is exactly as large as the groove cross sections of the first and second groove segments of the circumferential groove in order to be able to generate in this way a dynamic pressure at the deflection points, in particular at the interior deflection points, said dynamic pressure acting counter to a drag torque; however, a persistent accumulation of a coolant or lubricant reservoir should not occur here.

Despite the enlarged groove cross section of the outer opening or despite the different groove cross sections of the first and second inner openings, the smallest groove cross section of the inner grooves, optionally of the first and second inner grooves, is larger or smaller than, preferably larger than the smallest groove cross section of the outer grooves. Thus, the smallest groove cross section of the inner grooves in the case of a coolant and/or lubricant supply from inside, thus a coolant and/or lubricant supply directed radially outward, should be larger than the smallest groove cross section of the outer groove in order to achieve a dynamic pressure, which counteracts the drag torque, in the area of the deflection points, in particular in the area of the exterior deflection points.

According to another advantageous embodiment of the frictional part according to the invention, the outer grooves and the inner grooves extend, preferably straight, along a radial of the frictional part in order to achieve a certain independence of rotational direction of the frictional part.

In another advantageous embodiment of the frictional part according to the invention, the interior deflection points are arranged on an inner circle with a first radius and the exterior deflection points are arranged on an outer circle with a second radius, wherein the circles are arranged concentrically to each other and the first radius is smaller than the second radius.

In another advantageous embodiment of the frictional part according to the invention, the opening points are arranged on an intermediate circle with a third radius, wherein the intermediate circle is arranged concentrically to the inner and outer circles. The third radius is also larger than the first radius and smaller than the second radius. The intermediate circle is preferably an average circle, i.e. the difference between the third radius and the first radius corresponds to the difference between the second radius and the third radius.

In another advantageous embodiment of the frictional part according to the invention, the inner edge of the friction surface extends along an inner peripheral circle with a first peripheral radius of a circle and the outer edge of the friction surface extends along an outer peripheral circle with a second peripheral radius of a circle, wherein the peripheral circles are arranged concentrically to each other, preferably also concentrically to the inner and outer circle.

In another preferred embodiment of the frictional part according to the invention, the difference between the first radius and the first peripheral radius of a circle and/or the difference between the second radius and the second peripheral radius of a circle is at least 3 mm, particularly preferably more than 4 mm, in order to create friction sections or friction lining segments which have a sufficient size, and in order to prevent damage thereto, said damage potentially occurring during operation or already during the application of a friction lining or the like.

In order to create a frictional part that may be cooled particularly well, and which additionally shows an improved wear behavior, the ratio between the difference of the first and second peripheral radius of a circle and the difference between the first and second radius is larger than 3:2, particularly preferably larger than 3:1 in another advantageous embodiment of the frictional part according to the invention.

According to another advantageous embodiment of the frictional part according to the invention, the outer grooves end at the opening points. Thus, although additional grooves may be provided in the friction surface, which do not correspond to the previously mentioned grooves, these additional grooves should not open into the circumferential groove in the region of the opening points. The outer grooves should also not cross the circumferential groove in the opening point. In a corresponding way, it is preferred if the first inner grooves end at the exterior deflection points and the second inner grooves end at the interior deflection points in order to ensure a favorable flow behavior of the coolant and/or lubricant within the circumferential groove.

As already previously mentioned, additional grooves may be provided in the friction surface of the frictional part, which are not the previously described outer grooves, inner grooves, or circumferential groove. However, in order to maintain the advantageous friction, wear, and control behaviors of the frictional part according to the invention, the groove pattern in the friction surface is formed by more than 80%, preferably more than 90%, particularly preferably completely by the circumferential groove, the outer grooves, and the inner grooves in another advantageous embodiment of the frictional part according to the invention.

The invention will subsequently be explained in greater detail by means of exemplary embodiments with reference to the accompanying drawings. As shown in.

Figure 1:
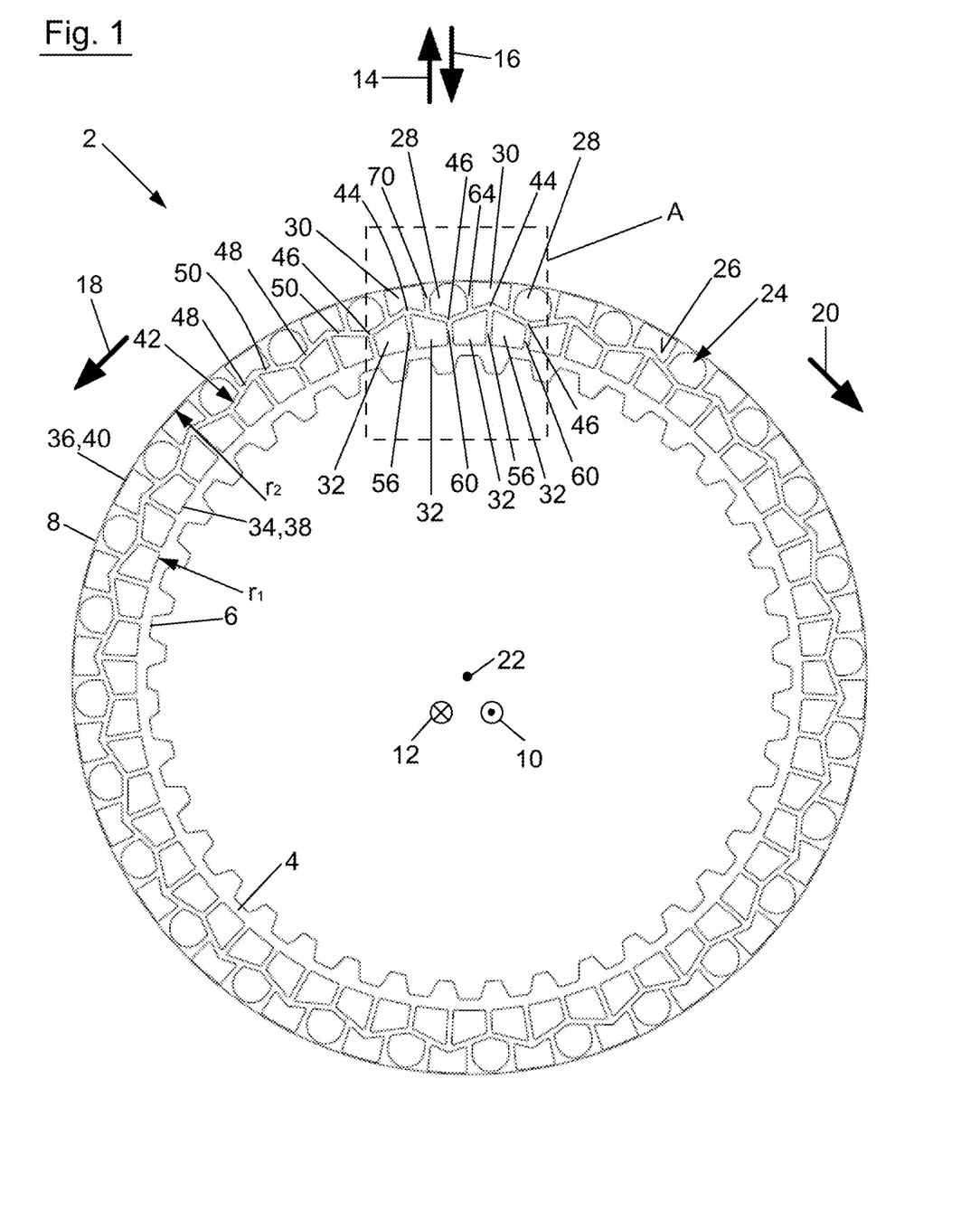
FIG. 1 a front view of a first embodiment of the frictional part according to the invention, FIG. 2 an enlarged depiction of section A from FIG. 1, FIG. 3 a front view of a second embodiment of the frictional part according to the invention, FIG. 4 an enlarged depiction of section B from FIG. 3.
Figure 2:
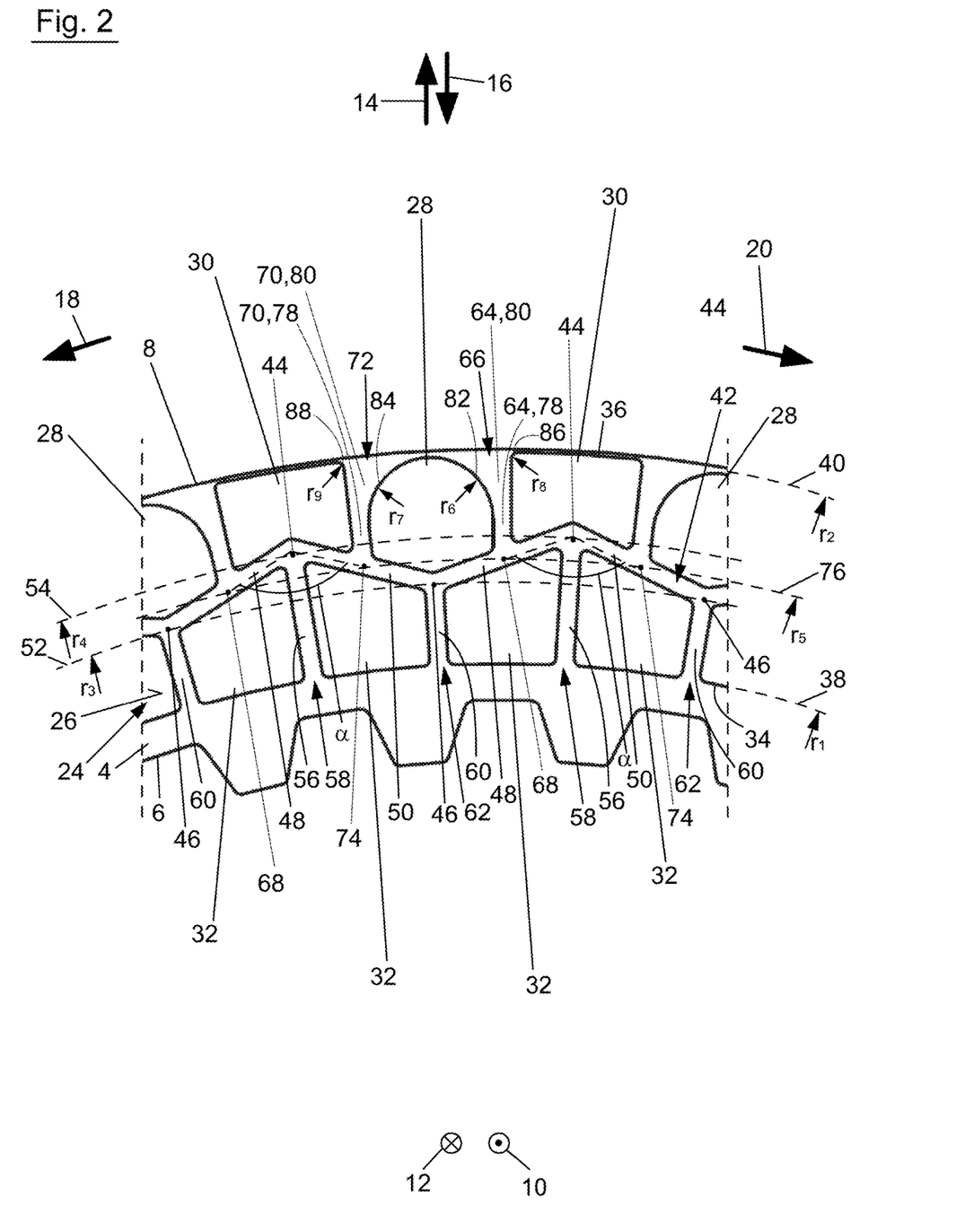

FIGS. 1 and 2 show a first embodiment of frictional part 2 according to the invention for a frictionally acting device. Friction part 2 as shown is designed in the present case as a disk for a disk clutch or disk brake and has a friction lining carrier 4. Friction lining carrier 4 is designed substantially as a metal or steel annular disk, which extends in the plane of the drawing and has an inner edge 6 and an outer edge 8. A drive profile, for example, an inner toothing, is provided at inner edge 6 and is formed as one piece with friction lining carrier 4. The inner toothing functions for the rotationally fixed connection of frictional part 2 to a disk carrier; however, it enables an axial displacement of frictional part 2 along the disk carrier. The present frictional part 2 is consequently a so-called inner disk. However, reference is made to the fact that frictional part 2 according to the invention might just as easily be an outer disk, in which the drive profile, preferably an outer toothing, would then be provided at outer edge 8. Opposite axial directions 10, 12, opposite radial directions 14, 16, and opposite circumferential directions 18, 20 are indicated by means of corresponding arrows, wherein an axis of rotation 22 of frictional part 2 extends in axial directions 10, 12 and circumferential directions 18, 20 are subsequently designated as first circumferential direction 18 and second circumferential direction 20.

A friction lining 24, not depicted in greater detail, and being, for example, a paper friction lining, is arranged on the front side of friction lining carrier 4, facing the observer, which faces in axial direction 10, and on the rear side of friction lining carrier 4, facing away from the observer, which faces in axial direction 12 and which is, however, not depicted in greater detail. Subsequently, only the structure of friction lining 24 on the front side of friction lining carrier 4 will be described; however, this description also applies correspondingly for the friction lining on the rear side of friction lining carrier 4 facing away from the observer.

Friction lining 24 is designed as segmented friction lining 24, which is consequently composed of a plurality of friction lining segments separated from each other, wherein the friction lining segments form friction sections to form an annular friction surface 26. Thus, first radially exterior friction sections 28 and second radially exterior friction sections 30 are provided, wherein first and second radially exterior friction sections 28, 30 follow each other alternating in circumferential directions 18, 20. In addition, a plurality of friction lining segments are formed as radially interior friction sections 32, which likewise follow one another spaced apart in circumferential direction 18, 20. Together, first radially exterior friction sections 28, second radially exterior friction sections 30, and radially interior friction sections 32 form friction surface 26, which has an inner edge 34 facing inward in radial direction 16 and an outer edge 36 facing outward in radial direction 14.

Inner edge 34 extends along an inner peripheral circle 38, which has a first peripheral radius of a circle $r_1$, while outer edge 36 of friction surface extends along an outer peripheral circle 40 with a second peripheral radius of a circle $r_2$. The two peripheral circles 38, 40 are arranged concentrically to each other, wherein first peripheral radius of a circle $r_1$ is smaller than second peripheral radius of a circle $r_2$. Grooves are provided between friction sections 28, 30, 32 formed by the friction lining segments of friction lining 24, especially as listed friction sections 28, 30, 32 are spaced apart from each other so that these grooves form a groove pattern in friction surface 26.

As is clear in FIGS. 1 and 2, a circumferential groove 42 is provided in friction surface 26. Circumferential groove 42 extends substantially in opposite circumferential directions 12, 14 and is formed continuously across friction surface 26 and is closed in circumferential direction 18, 20, i.e. is formed as annular. Circumferential groove 42 thereby contacts neither inner edge 34 nor outer edge 36 of friction surface 26. Circumferential groove 42 extends in a zig-zag or undulating fashion between radially exterior deflection points 44 and radially interior deflection points 46. Thus, circumferential groove 42 comprises a plurality of first groove segments 48, which extend in circumferential direction 18 from exterior deflection points 44 straight to interior deflection points 46. In addition, circumferential groove 42 comprises a plurality of second groove segments 50, which extend in the same circumferential direction 18 from interior deflection points 46 straight to exterior deflection points 44, so that a zig-zag shaped circumferential groove 42 is generated.

All interior deflection points 46 are arranged on a common inner circle 52 with a first radius $r_3$, while all exterior deflection points 44 are arranged on a common outer circle 54 with a second radius $r_4$. The two circles 52, 54 are arranged concentrically to each other and concentrically to peripheral circles 38, 40, wherein first radius $r_3$ is smaller than second radius $r_4$. In addition, the difference between first radius $r_3$ and first peripheral radius $r_1$ and the difference between second radius $r_4$ and second peripheral radius $r_2$ is at least 3 mm, particularly preferably more than 4 mm. Furthermore, the ratio between the difference of the first and second peripheral radius $r_1$, $r_2$ and the difference of the first and second radius $r_3$, $r_4$ is greater than 3:2, particularly preferably greater than 3:1 in order to ensure an advantageous radial spacing between circumferential groove 42 and inner edge 34 on the one side and an advantageous spacing between circumferential groove 42 and outer edge 36 of friction surface 26 on the other side.

In addition, a plurality of inner grooves, which are formed between radially interior friction sections 32 in circumferential direction 18, 20, is formed in friction surface 26. Thus, first inner grooves 56 are provided, which have a first inner opening 58 at inner edge 34 of friction surface 26 and extend straight along a radial to exterior deflection points 44 in order to open into circumferential groove 42. First inner grooves 56 thereby end at exterior deflection points 44, i.e., the first inner grooves 56 do not cross circumferential groove 42 nor do they extend beyond exterior deflection points 44. There are also no additional grooves provided within friction surface 26 which open into circumferential groove 42 at exterior deflection points 44. In addition, second inner grooves 60 are provided in friction surface 26, which each have a second inner opening 62 at inner edge 34 of friction surface 26 and extend, starting from second inner opening 62, straight along a radial to interior deflection points 46 to open into circumferential groove 42 there. Second inner grooves 60 also do not extend beyond interior deflection points 46 nor do they cross circumferential groove 42 in the region of interior deflection points 46; instead, second inner grooves 60 end at interior deflection points 46. There are also no additional grooves provided within friction surface 26 which open into circumferential groove 42 at exterior deflection points 46.

A plurality of outer grooves is additionally provided in annular friction surface 26. Thus, the groove pattern comprises first outer grooves 64, which each have a first outer opening 66 at outer edge 36 of friction surface 26 and extend substantially straight along a radial in the direction of first groove segments 48, wherein first outer grooves 64 open into circumferential groove 42 at opening points 68, consequently between exterior deflection points 44 and interior deflection points 46. First outer grooves 64 thereby end inwardly in radial direction 16 at opening points 68. Furthermore, second outer grooves 70 are provided, which have a second outer opening 72 at outer edge 36 of friction surface 26 and which extend starting from second outer openings 72 substantially straight and along a radial inward in radial direction 16 toward second groove segments 50 to open into second groove segments 50 of circumferential groove 42 at opening points 74, wherein opening points 74 are again arranged between radially exterior deflection points 44 and radially interior deflection points 46. Second outer grooves 70 also thereby end at opening points 74 without crossing circumferential groove 42. There are also no additional grooves provided which open into circumferential groove 42 at opening points 68 and/or 74. Opening points 68, 74 are additionally arranged on a common intermediate circle 76, which has a third radius $r_5$. Intermediate circle 76 is arranged concentrically to inner and outer circles 52, 54, wherein third radius $r_5$ is larger than first radius $r_3$ and smaller than second radius $r_4$. It has hereby proven advantageous if intermediate circle 76 is designed as an average circle with respect to inner and outer circles 52, 54, i.e., the following applies: $r_5-r_3=r_4-r_5$.

From the preceding description and associated FIGS. 1 and 2, it is clear that first and second inner grooves 56, 60 open into circumferential groove 42 between opening points 68, 74 in circumferential direction 18 or 20. Also, first outer grooves 64 and second outer grooves 70 follow each other alternating in circumferential direction 18, 20, wherein these are formed between first radially exterior friction sections and second radially exterior friction sections 30. First radially exterior friction sections 28 are thereby assigned to radially interior deflection points 46, while second radially exterior friction sections 30 are assigned to radially exterior deflection points 44.

As is particularly clear from FIG. 2, outer openings 66, 72 have a groove cross section which is larger than the groove cross section of inner openings 58, 62. For this purpose, first and second outer grooves 64, 70 are enlarged outward in radial direction 14, consequently in the direction of outer openings 66 or 72, wherein the enlargement is carried out substantially in circumferential direction 18, 20 and/or constantly or continuously. Thus, first and second outer grooves 64, 70 each have a first outer groove segment 78, which extends outward in radial direction 14 starting from respective opening point 68, 74 and has a constant groove cross section, and a second outer groove segment 80, which connects to first outer groove segment 78, extends outward in radial direction 14 up to respective outer opening 66 or 72, and is constantly or continuously enlarged.

Even if first and second outer openings 66, 72 depicted here have substantially the same groove cross section, first and second outer grooves 64, 70 are nevertheless enlarged in different ways. As is clear from FIG. 2, first outer groove 64 is enlarged more strongly in first circumferential direction 18 with respect to the radial through associated opening point 68 than in opposite, second circumferential direction 20. In contrast, second outer groove 70 is enlarged more strongly in second circumferential direction 20 with respect to a radial through associated opening point 74 than in first circumferential direction 18. Outer grooves 64 and 70, enlarged differently in these ways, thereby follow each other alternating in circumferential direction 18 or 20.

Each of first radially exterior friction sections 28 faces one of first outer grooves 64 in second circumferential direction 20 and one of second outer grooves 70 in first circumferential direction 18 in order to delimit the same. Each of first radially exterior friction sections 28 thereby has a rounded corner 82 with a radius of curvature $r_6$ facing first outer opening 66 and a rounded corner 84 with a radius of curvature $r_7$ facing second outer opening 62. Second radially exterior friction section 30, adjacent in circumferential direction 20, has a rounded corner 86 with a radius of curvature $r_5$ facing first outer opening 66, while second radially exterior friction section 30, adjacent in circumferential direction 18, has a rounded corner 88 with a radius of curvature $r_9$ facing second outer opening 72. Radii of curvature $r_6$ and $r_7$ of rounded corners 82, 84 are thereby larger than radii of curvature $r_8$ and $r_9$ of rounded corners 86, 88.

In the embodiment depicted, radii of curvature $r_6$ and $r_7$ are designed as essentially equally large, which also applies preferably for radii of curvature $r_8$ and $r_9$. The size radio between radius of curvature $r_6$ and radius of curvature $r_8$ of at least 5:1 has proven advantageous, which also applies preferably for the ratio between radius of curvature $r_7$ and radius of curvature $r_9$. In addition, it is clear from FIG. 2 that rounded corners 82 and 84 of first radially exterior friction section 28 transition preferably directly into each other so that first radially exterior friction section 28 is designed in an end section formed outward in radial direction 14 as a type of circular arc or circular segment. Even if corners 86 and 88 of second radially exterior friction sections 30 are likewise designed as rounded in an advantageous way, reference is supplementally made to the fact that such a rounding with a corresponding radius of curvature $r_8$, $r_9$ might also be fundamentally omitted. However, against the background of an advantageous wear behavior, at least a minor rounding of corners 86, 88 on second radially exterior friction sections 30 is to be preferred.

It has furthermore proven advantageous, if first and second groove segments 48, 50 of circumferential groove 42, joined in one of exterior deflection points 44, define an angle α which is greater than 130° and preferably lies between 140 and 145°. The groove cross section of circumferential groove 42, thus the cross section transverse to the extension direction of circumferential groove 42, should also be precisely as large at deflection points 44, 46 as the groove cross sections of first and second groove segments 48, 50 of circumferential groove 42. Thus, an enlarged reservoir for coolant and/or lubricant should be, in particular, omitted in the region of those deflection points 44, 46 into which first or second inner grooves 56, 60 open. In addition, the smallest groove cross section of the inner grooves, thus of first and/or second inner grooves 56, 60, is designed as larger or smaller than the smallest groove cross section of the outer grooves, thus, for example, of first and/or second outer grooves 64, 70. In this context, it is particularly preferred if the smallest groove cross section of inner grooves 56, 60 is larger than the smallest groove cross section of outer grooves 64, 70 when the coolant and/or lubricant supply is carried out from the inside, and thus outward in radial direction 14—as preferred in frictional part 2 according to FIGS. 1 and 2—so that an accumulation of coolant and/or lubricant occurs in circumferential groove 42 which leads to an improved heat absorption.

The groove pattern in friction surface 26 described with reference to FIGS. 1 and 2, is formed completely by circumferential groove 42, first and second inner grooves 56, 60, and first and second outer grooves 64, 70. The groove pattern may thereby fundamentally comprise additional grooves, which are not the already specified grooves; however, in this case the proportion of circumferential groove 42, inner grooves 56, 60, and outer grooves 64, 70 in the groove pattern should preferably be more than 80%, particular preferably more than 90%. The specified proportion thereby relates to the total surface occupied by all grooves in friction surface 26 in the top view according to FIG. 1.

A second embodiment of frictional part 2 according to the invention will be subsequently described with reference to FIGS. 3 and 4. The second embodiment corresponds substantially to the first embodiment according to FIGS. 1 and 2, so that subsequently only the differences shall be addressed; identical reference numerals are used for identical or similar parts and the previous description correspondingly generally applies.

Figure 3:
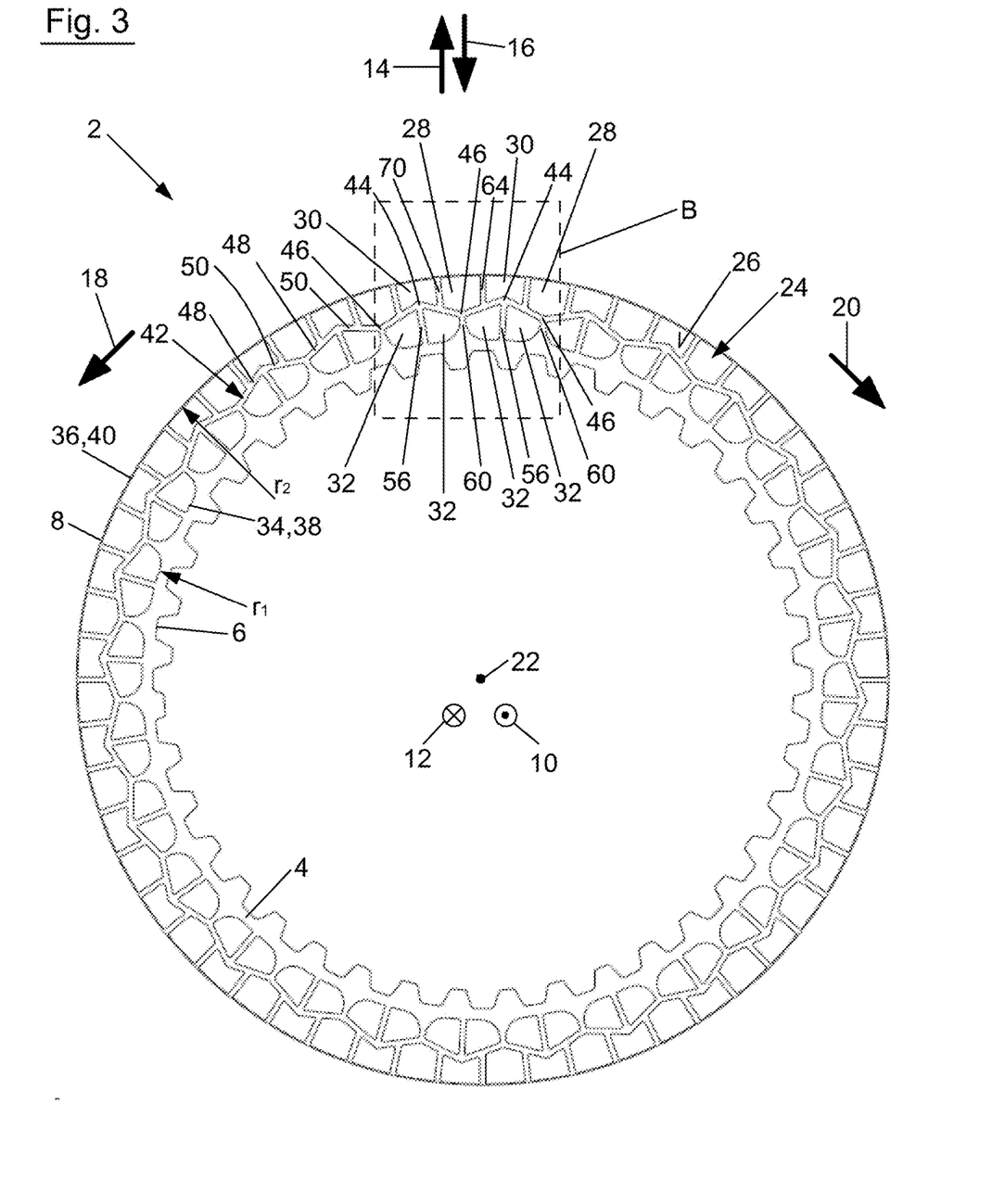
Figure 4:
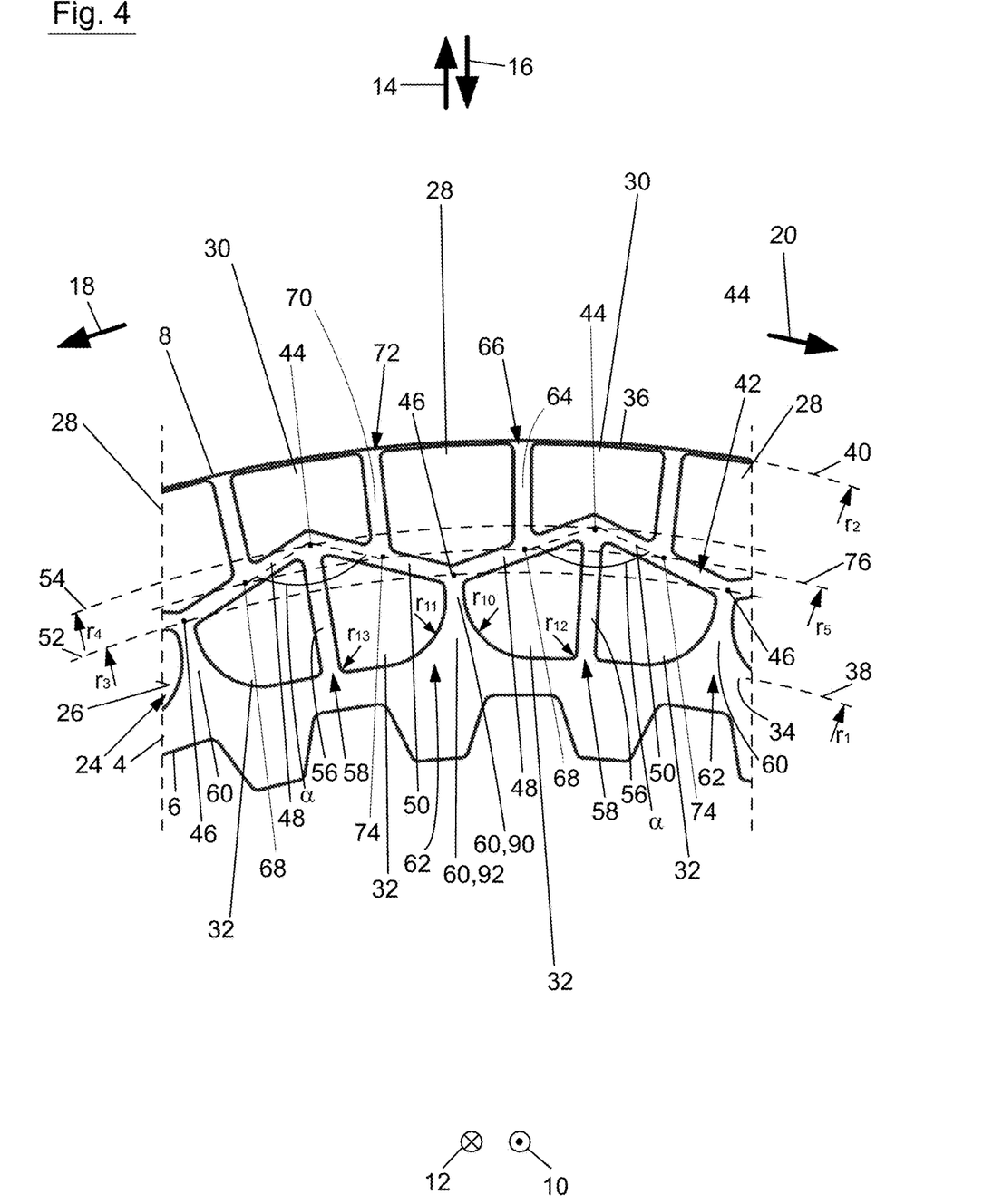

While frictional part 2 according to FIGS. 1 and 2 is advantageous, in particular, in disk clutches or brakes with a coolant and/or lubricant supply from the inside, thus a coolant and/or lubricant supply starting from inner edge 34 outward in radial direction 14 toward outer edge 36, frictional part 2, according to the second embodiment in FIGS. 3 and 4, effects its advantages, in particular, in a disk clutch or brake with an external coolant and/or lubricant supply, thus a coolant and/or lubricant supply starting from outer edge 36 inward in radial direction 16 toward inner edge 34.

In the second embodiment, first inner openings 58 of first inner grooves 56 have a groove cross section which is larger or smaller than a groove cross section of second inner opening 62 of second inner grooves 60. In the embodiment depicted, the groove cross sections of first inner openings 58 are designed as smaller than the groove cross sections of second inner openings 62. The consequently larger groove cross section of second inner opening 62 is traced back to the fact that second inner groove 60 is enlarged inward in radial direction 16 and thus in the direction of second inner opening 62. The enlargement herein takes place again preferably continuously and/or constantly. It has also proven advantageous herein, regardless of which of two inner grooves 56, 60 has the larger groove cross section at inner opening 58 or 62, if corresponding inner groove 56 or 60 has a first inner groove segment 90, which extends starting from respective deflection point 44 or 46 inward in radial direction 16 and has a substantially constant groove cross section, and has a second inner groove segment 92, which connects in radial direction 16 to first inner groove segment 90, and extends up to inner opening 58 or 62 and is correspondingly enlarged.

To form the groove cross sections of different sizes at first and second inner openings 58, 62, radially interior friction sections 32 each have rounded corners facing inner openings 58, 62. As is clear from FIGS. 3 and 4, the corners of radially interior friction sections facing second inner openings 62 are rounded with a radius of curvature $r_{10}$ or $r_{11}$, which are designed as essentially equally large in the embodiment depicted. Furthermore, the corners of radially interior friction sections 32 facing first inner openings 58 are rounded with a radius of curvature $r_{12}$ or $r_{13}$, wherein the radii of curvature $r_{12}$ and $r_{13}$ again essentially correspond to one another. Radii of curvature $r_{10}$ and $r_{11}$ are thereby larger than radii of curvature $r_{12}$ and $r_{13}$. A size ratio between radius of curvature $r_{10}$ and $r_{12}$ and between radius of curvature $r_{11}$ and $r_{13}$ of at least 5:1 has also proven advantageous. In addition, radii of curvature $r_{10}$ through $r_{13}$ are selected in such a way that radially interior friction sections 32 are shaped or designed identically, even it they are arranged in different orientations on friction lining carrier 4, as is clear from FIGS. 3 and 4.

In addition, it should be mentioned that the groove cross sections of second inner opening 62 are designed as larger than the groove cross sections of outer openings 66, 72 of outer grooves 64, 70.

Even if not depicted, a combination of the first and second embodiment would basically be possible, so that, for example, outer grooves 64, 70 of the second embodiment according to FIGS. 3 and 4 might be enlarged in a corresponding way as the outer grooves according to FIGS. 1 and 2. By this means, a frictional part 2 would be created that is suitable and thus flexibly usable both for coolant and/or lubricant supply from inside and also for coolant and/or lubricant supply from outside; however, the advantages of frictional part 2 according to the first embodiment are more significantly pronounced with a coolant and/or lubricant supply from inside, while the advantages of a frictional part 2 according to the second embodiment are more significantly pronounced with a coolant and/or lubricant supply from outside.

REFERENCE NUMERALS

2 Frictional part
4 Friction lining carrier
6 Inner edge
08 Outer edge
10 Axial direction
12 Axial direction
14 Radial direction
16 Radial direction
18 First circumferential direction
20 Second circumferential direction
22 Axis of rotation
24 Friction lining
26 Friction surface
28 First radially exterior frictional section
30 Second radially exterior frictional section
32 Radially interior frictional section
34 Inner edge
36 Outer edge
38 Inner peripheral circle
40 Outer peripheral circle
42 Circumferential groove
44 Radially exterior deflection point
46 Radially interior deflection point
48 First groove segments
50 Second groove segments
52 Inner circle
54 Outer circle
56 First inner grooves
58 First inner opening
60 Second inner grooves
62 Second inner opening
64 First outer grooves
66 First outer opening
68 Opening points
70 Second outer grooves
72 Second outer opening
74 Opening points
76 Intermediate circle
78 First outer groove segment
80 Second outer groove segment
82 Rounded corner
84 Rounded corner
86 Rounded corner
88 Rounded corner
90 First inner groove segment
92 Second inner groove segment
α Inner angle
$r_1$ First peripheral radius of a circle
$r_2$ Second peripheral radius of a circle
$r_3$ First radius
$r_4$ Second radius
$r_5$ Third radius
$r_6$ Radius of curvature
$r_7$ Radius of curvature
$r_8$ Radius of curvature
$r_9$ Radius of curvature
$r_{10}$ Radius of curvature
$r_{11}$ Radius of curvature
$r_{12}$ Radius of curvature
$r_{13}$ Radius of curvature

The invention claimed is:

1. A frictional part (2) for a frictionally acting device comprising an annular friction surface (26), which has an inner edge (34) and an outer edge (36), wherein a circumferential groove (42) which extends in a zig-zag or undulating fashion between radially interior and radially exterior deflection points (44, 46), a plurality of outer grooves (64, 70) which each have an outer opening (66, 72) at the outer edge (36) and open into the circumferential groove (42) at opening points (68, 74) between the deflection points (44, 46), and a plurality of inner grooves (56, 60) which each have an inner opening (58, 62) at the inner edge (34) and open into the circumferential groove (42) between the opening points (68, 74), are provided in the friction surface (26), wherein the outer opening (66, 72) of at least one of the first and second outer grooves (64, 70) has a groove cross section which is larger than a groove cross section of the inner opening (58, 62) of at least one of the inner grooves (56, 60),
wherein the friction surface (26) is formed partially from first friction sections (28), radially exterior with respect to the circumferential groove (42), which are assigned to radially interior deflection points (46), and second radially exterior friction sections (30) which are assigned to the radially exterior deflection points (44), between which the first and second outer grooves (64, 70) are formed, wherein at least one first radially exterior friction section (28) faces one of the first outer grooves (64) in the second circumferential direction (20) and one of the second outer grooves (70) in the first circumferential direction (18), and the at least one first radially exterior friction section (28) has rounded corners (82, 84) facing the outer openings (66, 72), whose radius of curvature (r6, r7) is larger than any radius of curvature (r8, r9) of the rounded corners (88, 86) of the adjacent second radially exterior friction section (30) facing the outer openings (66, 72) and
wherein the friction surface (26) is formed partially by friction sections (32) lying radially interior with respect to the circumferential groove (42), between which the first and second inner grooves (56, 60) are formed and which have corners facing the inner openings (58, 62), wherein the corners facing the inner openings (58, 62) with the larger groove cross section are rounded and have a radius of curvature (r10, r11), which is larger than any radius of curvature (r12, r13) of the corners facing the inner openings (58) with the smaller groove cross section, and
wherein the corners facing the inner openings (58, 62) with the larger groove cross section have a radius of curvature (r10, r11) which are at least 5 times as large as any radius of curvature (r12, r13) of the corners facing the inner openings (58) with the smaller groove cross section.

2. The frictional part (2) according to claim 1, wherein the at least one of the first and second outer groove (64, 70) is enlarged in the direction of the outer opening (66, 72), wherein the first outer groove (64) is more enlarged in a first circumferential direction (18) than in an opposite, second circumferential direction (20), and the first and second outer grooves (64, 70) follow each other alternating in circumferential direction 18; 20).

3. The frictional part (2) according to claim 1, wherein the inner grooves (56, 60) comprise first inner grooves (56), which each have a first inner opening (58) at the inner edge (34) and open into the circumferential groove (42) at exterior deflection points (44), and/or second inner grooves (60), which each have a second inner opening (62) at the inner edge (34) and open into the circumferential groove (42) at interior deflection points (46), wherein the groove cross section of the exterior opening (66, 72) is larger than the groove cross section of the first inner opening (58) and/or the second inner opening (62).

4. A frictional part (2) for a frictionally acting device comprising an annular friction surface (26), which has an inner edge (34) and an outer edge (36), wherein a circumferential groove (42) which extends in a zig-zag or undulating fashion between radially interior and radially exterior deflection points (44, 46), a plurality of outer grooves (64, 70) which each have an outer opening (66, 72) at the outer edge (36) and open into the circumferential groove (42) at opening points (74, 68) between the deflection points (44, 46), first inner grooves (56) which each have an inner opening (58) and open into the circumferential groove (42) at the exterior deflection points (44), and second inner grooves (60), which each have a second inner opening (62) at the inner edge (34) and open into the circumferential groove (42) at interior deflection points (46), are provided in the friction surface (26), wherein the first inner opening (58) of at least one of the first inner grooves (56) has a groove cross section which is smaller than a groove cross section of the second inner opening (62) of at least one of the second inner grooves (60) wherein at least one first radially exterior friction section (28) faces one of the first outer grooves (64) in a second circumferential direction (20) and one of the second outer grooves (70) in a first circumferential direction (18), and at least one first radially exterior friction section (28) has rounded corners (82, 84) facing outer openings (66, 72), whose radius of curvature (r6, r7) is larger than any radius of curvature (r8, r9) of the rounded corners (88, 86) of an adjacent second radially exterior friction section (30) facing the outer openings (66, 72), wherein the friction surface (26) is formed partially by friction sections (32) lying radially interior with respect to the circumferential groove (42), between which the first and second inner grooves (56, 60) are formed and which have corners facing the inner openings (58, 62), wherein the corners facing the inner openings (58, 62) with the larger groove cross section are rounded and have a radius of curvature (r10, r11), which is larger than any radius of curvature (r12, r13) of the corners facing the inner openings (58) with the smaller groove cross section, and wherein the corners facing the inner openings (58, 62) with the larger groove cross section have a radius of curvature (r10, r11) which are at least 5 times as large as any radius of curvature (r12, r13) of the corners facing the inner openings (58) with the smaller groove cross section.

5. The frictional part (2) according to claim 1, wherein the frictional part (2) has a friction lining carrier (4), wherein the friction surface (26) is formed from a friction lining (24) made from a plurality of friction lining segments spaced apart from each other applied on the friction lining carrier (4), between which friction lining segments the circumferential groove (42), the inner grooves (56, 60), and the outer grooves (64, 70) are formed, wherein the friction lining segments form the friction sections (28, 30, 32).

6. The frictional part (2) according to claim 4, wherein the circumferential groove (42) comprises a plurality of first groove segments (48) which extend in the one circumferential direction from the exterior deflection points (44) to the interior deflection points (46), and a plurality of second groove segments (50), which extend in the same circumferential direction from the interior deflection points (46) to the exterior deflection points (44), wherein the first and second groove segments (48, 50) of the circumferential groove (42) are designed as straight.

7. The frictional part (2) according to claim 6, wherein the first and second groove segments (48, 50) of the circumferential groove (42), joined in an exterior deflection point (44), define an inner angle ($\alpha$) which is greater than 130°.

8. The frictional part (2) according to claim 4, wherein the groove cross section of the circumferential groove (42) at the deflection points (44, 46) is exactly as large as the groove cross sections of the first and second groove segments (48, 50) of the circumferential groove (42).

9. The frictional part (2) according to claim 4, wherein the smallest groove cross section of the inner grooves (56, 60) is larger than the smallest groove cross section of the outer grooves (64, 70).

10. The frictional part (2) according to claim 4, wherein the outer grooves (64, 70) and the inner grooves (56, 60) extend straight along a radial of the frictional part (2).

11. The frictional part (2) according to claim 4, wherein the interior deflection points (46) are arranged on an inner circle (52) with a first radius (r3) and the exterior deflection points (44) are arranged on an exterior circle (54) with a second radius (r4), which are arranged concentrically to each other, wherein the first radius (r3) is smaller than the second radius (r4) and the opening points (68, 74) are arranged on an average circle (76) with a third radius (r5), which is arranged concentrically to the inner and outer circles (52, 54), wherein the third radius (r5) is larger than the first radius (r3) and smaller than the second radius (r4).

12. The frictional part (2) according to claim 11, wherein the inner edge (34) of the friction surface (26) extends along an inner peripheral circle (38) with a first peripheral radius of a circle (r1) and the outer edge (36) of the friction surface (26) extends along an outer peripheral circle (40) with a second peripheral radius of a circle (r2), wherein the peripheral circles (38, 40) are arranged concentrically to each other and also concentrically to the inner and outer circles (52, 54), wherein the difference between the first radius (r3) and the first peripheral radius of a circle (r1) and/or the difference between the second radius (r4) and the second peripheral radius of a circle (r2) is at least 3 mm, wherein the ratio between the difference of the first and second peripheral radius of a circle (r1−r2) and the difference of the first and second radius (r3−r4) is larger than 3 to 2.

13. The frictional part (2) according to claim 4, wherein the outer grooves (64, 70) end at the opening points (68, 74), wherein the first inner grooves (56) end at the exterior deflection points (44) and the second inner grooves (60) end at the interior deflection points (46), and/or that the groove pattern in the friction surface (26) is formed by more than 80%, by the circumferential groove (42), the outer grooves (64, 70) and the inner grooves (56, 60).

14. The frictional part (2) according to claim 2, wherein at least one second outer groove (70) is more enlarged in the second circumferential direction (20) than in the first circumferential direction (18).

15. The frictional part (2) according to claim 6, wherein the first outer grooves (64) are provided, which open into the first groove segments (48) of the circumferential groove (42), and the second outer grooves (70) are provided, which open into the second groove segments (50) of the circumferential groove (42).

16. The frictional part (2) according to claim 7, wherein the inner angle (α) lies between 140° and 145°.

* * * * *

UNITED STATES PATENT AND TRADEMARK OFFICE
CERTIFICATE OF CORRECTION

PATENT NO. : 11,174,902 B2
APPLICATION NO. : 16/408699
DATED : November 16, 2021
INVENTOR(S) : Florian Oliver Dannwolf et al.

It is certified that error appears in the above-identified patent and that said Letters Patent is hereby corrected as shown below:

On the Title Page

Item (73), Assignee, please delete "Borg Warner Inc." and replace with -- BorgWarner Inc. --

In the Claims

Claim 1, Column 14, Line 10, please delete "deflection points (44, 46)" and replace with
-- deflection points (46, 44) --

Claim 1, Column 14, Line 14, please delete "a plurality of inner grooves (56, 60)," and replace with
-- a plurality of first and second inner grooves (56, 60), --

Claim 1, Column 14, Lines 14-15, please delete "which each have an inner opening (58, 62)" and replace with -- wherein the first inner grooves (56) have a first inner opening (58) and the second inner grooves (60) have a second inner opening (62) --

Claim 1, Column 14, Line 21, please delete "inner opening (58, 62)" and replace with -- first inner openings (58) --

Claim 1, Column 14, Lines 21-22, please delete "inner grooves (56, 60)," and replace with -- first and second inner grooves (56, 60), --

Claim 1, Column 14, Line 30, please delete "at least one first radially" and replace with -- at least one of the first radially --

Claim 1, Column 14, Line 31, please delete "friction section (28)" and replace with -- friction sections (28) --

Claim 1, Column 14, Lines 34-35, please delete "at least one first radially" and replace with -- at least one of the first radially --

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,174,902 B2

Claim 1, Column 14, Line 35, please delete "friction section (28)" and replace with -- friction sections (28) --

Claim 1, Column 14, Line 45, please delete "inner openings (58, 62)" and replace with -- first and second inner openings (58,62) --

Claim 1, Column 14, Line 46, please delete "inner openings (58, 62)" and replace with -- second inner openings (62) --

Claim 1, Column 14, Line 50, please delete "inner openings (58)" and replace with -- first inner openings (58) --

Claim 1, Column 14, Line 52, please delete "inner openings (58, 62)" and replace with -- second inner openings (62) --

Claim 1, Column 14, Line 54, please delete "at least 5 times as large" and replace with -- at least five times as large --

Claim 1, Column 14, Line 56, please delete "inner openings (58)" and replace with -- first inner openings (58) --

Claim 2, Column 14, Line 65, please delete "direction 18; 20)." and replace with -- direction (18; 20). --

Claim 3, Column 15, Line 1, please delete "a first inner opening (58)" and replace with -- the first inner opening (58) --

Claim 3, Column 15, Line 4, please delete "a second inner opening (62)" and replace with -- the second inner opening (62) --

Claim 3, Column 15, Lines 8-10, please delete "the first inner opening (58) and/or the second inner opening (62)." and replace with -- the first inner opening (58). --

Claim 4, Column 15, Line 16, please delete "deflection points (44,46)" and replace with -- deflection points (46, 44) --

Claim 4, Column 15, Lines 16-17, please delete "a plurality of outer grooves (64, 70)" and replace with -- a plurality of first and second outer grooves (64, 70), --

Claim 4, Column 15, Line 17, please delete "which each have an outer opening (66, 72)" and replace with -- wherein the first outer grooves (64) have a first outer opening (66) and the second outer grooves (70) have a second outer opening (72) --

Claim 4, Column 15, Lines 30-31, please delete "wherein at least one first radially exterior friction section (28)" and replace with -- wherein at least one of first radially exterior friction section sections (28) --

CERTIFICATE OF CORRECTION (continued)
U.S. Pat. No. 11,174,902 B2

Claim 4, Column 15, Lines 34-35, please delete "at least one first radially exterior friction section (28)" and replace with -- the at least one of the first radially exterior friction section sections (28) --

Claim 4, Column 15, Lines 35-36, please delete "outer openings (66, 72)," and replace with -- the first and second outer openings (66, 72), --

Claim 4, Column 15, Line 39, please delete "the outer openings (66, 72)," and replace with -- the first and second outer openings (66, 72), --

Claim 4, Column 15, Line 44, please delete "inner openings (58, 62)" and replace with -- first and second inner openings (58, 62) --

Claim 4, Column 15, Line 45, please delete "inner openings (58, 62)" and replace with -- second inner openings (62) --

Claim 4, Column 15, Line 49, please delete "inner openings (58)" and replace with -- first inner openings (58) --

Claim 4, Column 15, Line 51, please delete "inner openings (58, 62)" and replace with -- second inner openings (62) --

Claim 4, Column 15, Line 53, please delete "at least 5 times as large" and replace with -- at least five times as large --

Claim 4, Column 15, Line 55, please delete "inner openings (58)" and replace with -- first inner openings (58) --